US012681171B2

(12) United States Patent
Renaud et al.

(10) Patent No.: US 12,681,171 B2
(45) Date of Patent: Jul. 14, 2026

(54) VEHICLE ASSEMBLY COMPRISING A RADAR SENSOR AND A SET OF LAYERS

(71) Applicant: VALEO VISION, Bobigny (FR)

(72) Inventors: Pierre Renaud, Bobigny (FR); Pierre Albou, Bobigny (FR)

(73) Assignee: Valeo Vision, Bobigny (FR)

( * ) Notice: Subject to any disclaimer, the term of this patent is extended or adjusted under 35 U.S.C. 154(b) by 461 days.

(21) Appl. No.: 18/000,764

(22) PCT Filed: Jun. 1, 2021

(86) PCT No.: PCT/EP2021/064617
§ 371 (c)(1),
(2) Date: Dec. 5, 2022

(87) PCT Pub. No.: WO2021/249817
PCT Pub. Date: Dec. 16, 2021

(65) Prior Publication Data
US 2023/0243961 A1 Aug. 3, 2023

(30) Foreign Application Priority Data

Jun. 9, 2020 (FR) ....................................... 2006005

(51) Int. Cl.
*G01S 13/931* (2020.01)
*G01S 7/02* (2006.01)
(Continued)

(52) U.S. Cl.
CPC ............ *G01S 13/931* (2013.01); *G01S 7/027* (2021.05); *H01Q 1/3233* (2013.01); *H01Q 1/422* (2013.01); *G01S 2013/93277* (2020.01)

(58) Field of Classification Search
CPC ................... G01S 13/931; G01S 7/027; G01S 2013/93277; H01Q 1/3233; H01Q 1/422; H01Q 21/28
See application file for complete search history.

(56) References Cited

U.S. PATENT DOCUMENTS 6,028,560 A 2/2000 Pfizenmaier et al.
9,812,787 B2 11/2017 Binzer
(Continued)

FOREIGN PATENT DOCUMENTS

CN 107026308 A 8/2017
CN 108615975 A 10/2018
(Continued)

OTHER PUBLICATIONS

Z. Qamar, N. Aboserwal and J. L. Salazar-Cerreno, "An Accurate Method for Designing, Characterizing, and Testing a Multi-Layer Radome for mm-Wave Applications," in IEEE Access, vol. 8, pp. 23041-23053, 2020, doi: 10.1109/ACCESS.2020.2970544 (Year: 2020).*

(Continued)

*Primary Examiner* — Yonghong Li
(74) *Attorney, Agent, or Firm* — Valeo Vision

(57) ABSTRACT

The invention relates to a vehicle assembly for a vehicle, with the vehicle assembly including a radar sensor configured to transmit/receive radar waves. The radar sensor being placed facing a layer assembly. The layer assembly includes at least two dielectric layers, these dielectric layers including a primary layer and a secondary layer separated by a layer of air. The layer of air has a thickness equal to $(m3\times(\lambda/2))/\cos(\theta3)$, with $\theta3$ an angle of incidence of exiting reflected waves striking the secondary layer and $m3=1, \ldots$ to N, N being an integer, the exiting reflected waves deriving from radar waves transmitted by the radar sensor.

10 Claims, 3 Drawing Sheets

(51) Int. Cl.
    *H01Q 1/32*            (2006.01)
    *H01Q 1/42*            (2006.01)

(56)         References Cited

U.S. PATENT DOCUMENTS

| | | | |
|---|---|---|---|
| 10,120,074 B2 | 11/2018 | Kasaba et al. | |
| 10,135,131 B2 | 11/2018 | Takao et al. | |
| 10,205,215 B2 | 2/2019 | Miyoshi et al. | |
| 10,218,048 B2 | 2/2019 | Miyoshi et al. | |
| 10,322,566 B2 | 6/2019 | Kamo | |
| 10,641,453 B2 | 5/2020 | Kwak et al. | |
| 11,374,311 B2 * | 6/2022 | Yamada | H01Q 1/422 |
| 12,455,343 B2 | 10/2025 | Albou et al. | |
| 2003/0052810 A1 * | 3/2003 | Artis | H01Q 1/44 |
| | | | 343/872 |
| 2011/0050370 A1 | 3/2011 | Lee et al. | |
| 2014/0091969 A1 * | 4/2014 | Shi | G01S 13/02 |
| | | | 342/385 |
| 2016/0248152 A1 | 8/2016 | Takao et al. | |
| 2017/0207514 A1 * | 7/2017 | Kamo | B32B 7/05 |
| 2017/0222311 A1 * | 8/2017 | Hess | G01S 13/931 |
| 2019/0267705 A1 | 8/2019 | Klar et al. | |
| 2020/0003873 A1 * | 1/2020 | Nagao | G02F 1/13 |
| 2021/0265717 A1 * | 8/2021 | Manley | H01Q 1/42 |
| 2024/0012137 A1 | 1/2024 | Albou et al. | |

FOREIGN PATENT DOCUMENTS

| | | | |
|---|---|---|---|
| CN | 109690869 A | 4/2019 | |
| DE | 19710811 A1 | 9/1998 | |
| DE | 102011115829 A1 | 4/2013 | |
| DE | 102011115952 A1 | 4/2013 | |
| EP | 1120310 A2 | 8/2001 | |
| EP | 3428510 A1 | 1/2019 | |
| JP | 2003-524751 A | 8/2003 | |
| JP | 2010137758 A | * 6/2010 | |
| JP | 2011-093378 A | 5/2011 | |
| JP | 2017-161431 A | 9/2017 | |
| JP | 2019-086452 A | 6/2019 | |
| JP | 2019-176271 A | 10/2019 | |
| JP | 2021099984 A | 7/2021 | |
| WO | 2013012360 A1 | 1/2013 | |

OTHER PUBLICATIONS

JP_2010137758_A_I_translate.pdf (Year: 2010).*

Japan Patent Office, Office Action (with English translation) of corresponding Japanese Patent Application No. 2022-575835, dated Nov. 22, 2023.

Japan Patent Office, Search Report (with English translation) of corresponding Japanese Patent Application No. 2022-575835, dated Nov. 24, 2023.

European Patent Office, International Search Report (with English translation) and Written Opinion of corresponding International Application No. PCT/EP2021/064617, dated Sep. 2, 2021.

China Patent Office, Office Action (with English translation) and Search Report of corresponding Chinese Patent Application No. 202180041071.4, dated Dec. 26, 2023, 12 pages.

European Patent Office, Office Action of corresponding European Patent Application No. 21728933.9, dated Jul. 23, 2025, 4 pages.

* cited by examiner

VEHICLE ASSEMBLY COMPRISING A RADAR SENSOR AND A SET OF LAYERS

TECHNICAL FIELD

The present invention relates to a vehicle assembly. It is particularly but non-limitingly applicable to motor vehicles.

BACKGROUND OF THE INVENTION

A vehicle assembly known to those skilled in the art comprises:

a radar sensor configured to transmit/receive radar waves, and a layer assembly comprising at least two dielectric layers, these dielectric layers including a primary layer and a secondary layer separated by a layer of air.

This vehicle assembly is placed at the front or at the rear of the vehicle, in order to meet needs in respect of detection of objects in the environment outside the vehicle.

One drawback of this prior art is that the radar sensor is placed behind the layer assembly. The radar waves must thus pass through the dielectric layers to detect an object in the environment outside the vehicle. Some of these radar waves are reflected by the dielectric layers, and inside the layer of air between the dielectric layers. Therefore, the power of the radar waves exiting from the layer assembly is lower than the power of the radar waves initially transmitted by the radar sensor and entering into the layer assembly. This thus decreases the detection range of the radar sensor. Consequently, detection errors or non-detection of an object even though the latter is present in the environment outside the vehicle may occur.

SUMMARY OF THE INVENTION

In this context, the present invention aims to provide a vehicle assembly allowing the mentioned drawback to be solved.

To this end, the invention provides a vehicle assembly for a vehicle, said vehicle assembly comprising:

a radar sensor configured to transmit/receive radar waves, said radar sensor being placed facing a layer assembly, and said layer assembly, which comprises at least two dielectric layers, these dielectric layers including a primary layer and a secondary layer separated by a layer of air, characterized in that said layer of air has a thickness equal to $(m3\times(\lambda/2))/\cos(\theta3)$, with $\theta3$ an angle of incidence of exiting reflected waves striking said secondary layer and $m3=1, \ldots$ to N, N being an integer, said exiting reflected waves deriving from radar waves transmitted by said radar sensor.

Thus, as will be seen in detail below, defining the thickness of the layer of air in this way will allow exiting radar waves of order 2 to add so that there is no substantial loss of power between a radar wave exiting from the layer assembly on the side opposite the radar sensor and a radar wave initially transmitted by the radar sensor. Therefore, there will be little loss of power during the transmission of the initially transmitted radar wave through the primary layer, the layer of air and the secondary layer, except as a result of absorption of some of the radar waves by the material of the layers. Detection of an object by the radar sensor will thus be precise.

According to non-limiting embodiments, said vehicle assembly may further comprise, alone or in any technically possible combination, one or more additional features selected from the following.

According to one non-limiting embodiment, said exiting reflected waves are waves exiting from said primary layer on the side opposite said radar sensor.

According to one non-limiting embodiment, said radar sensor is a radar sensor employing millimeter waves (waves between 24 GHz and 300 GHz) or sub-microwaves (waves between 300 MHz and 81 GHz) or microwaves (waves between 1 GHz and 300 GHz).

According to one non-limiting embodiment, said radar waves are transmitted in a frequency band comprised between 100 MHz and 3 GHz.

According to one non-limiting embodiment, said primary layer has a thickness equal to $(\lambda/(2n1 \cos \beta1))+(m1\times\lambda)$, with $\beta1$ a refracted angle corresponding to an angle of incidence $\theta1$ of a transmitted radar wave and n1 the refractive index of said primary layer and $m1=1, \ldots$ to N, N being an integer.

According to one non-limiting embodiment, the thickness of said primary layer is defined with an angle of incidence $\theta1$ equal to $\arctan(d1/(2e4))$, with e4 the distance between said radar sensor and said primary layer.

According to one non-limiting embodiment, said secondary layer has a thickness equal to $(\lambda/(2n2 \cos \beta2))+(m2\times\lambda)$, with $\beta2$ a refracted angle corresponding to an angle of incidence $\theta2$ of a radar wave exiting from said primary layer and n2 the refractive index of said secondary layer and $m2=1, \ldots$ to N, N being an integer.

According to one non-limiting embodiment, said primary layer is a decorative part and said secondary layer is an exit lens of a light-emitting device of said vehicle.

According to one non-limiting embodiment, said light-emitting device is a headlamp or a tail lamp.

According to one non-limiting embodiment, said primary layer is a luminous element of a logo and said secondary layer is an exit lens of a logo of said vehicle.

According to one non-limiting embodiment, said primary layer is a radome and said secondary layer is a logo.

According to one non-limiting embodiment, said layer assembly comprises more than two dielectric layers, these dielectric layers including primary layers and secondary layers separated by a layer of air.

According to one non-limiting embodiment, the angle of incidence $\theta3$ is equal to the angle of incidence $\theta1$.

According to one non-limiting embodiment, the angle of incidence $\theta3$ is equal to the angle of incidence $\theta2$.

According to one non-limiting embodiment, the angle of incidence $\theta2$ is equal to the angle of incidence $\theta1$.

A layer assembly for a vehicle is also provided, said layer assembly being configured to be placed facing a radar sensor that is configured to transmit/receive radar waves, and comprising at least two dielectric layers, these dielectric layers including a primary layer and a secondary layer separated by a layer of air, characterized in that said layer of air has a thickness equal to $(m3\times(\lambda/2))/\cos(\theta3)$, with $\theta3$ an angle of incidence of exiting reflected waves striking said secondary layer and $m3=1, \ldots$ to N, N being an integer, said exiting reflected waves deriving from radar waves transmitted by said radar sensor.

According to one non-limiting embodiment, said layer assembly comprises more than two dielectric layers, these dielectric layers including primary layers and secondary layers separated by a layer of air.

BRIEF DESCRIPTION OF DRAWINGS

The invention and the various applications thereof will be better understood on reading the following description and on examining the accompanying figures, in which.

DETAILED DESCRIPTION OF THE INVENTION

Elements that are identical in terms of structure or function appearing in various figures retain the same references, unless indicated otherwise.

The vehicle assembly 1 for a vehicle 2 according to the invention is described with reference to FIGS. 1 to 3. In one non-limiting embodiment, the vehicle 2 is a motor vehicle. By motor vehicle, what is meant is any type of motorized vehicle. This embodiment is considered, by way of non-limiting example, in the remainder of the description. In the remainder of the description, the vehicle 2 is thus also referred to as the motor vehicle 2.

Figure 1:
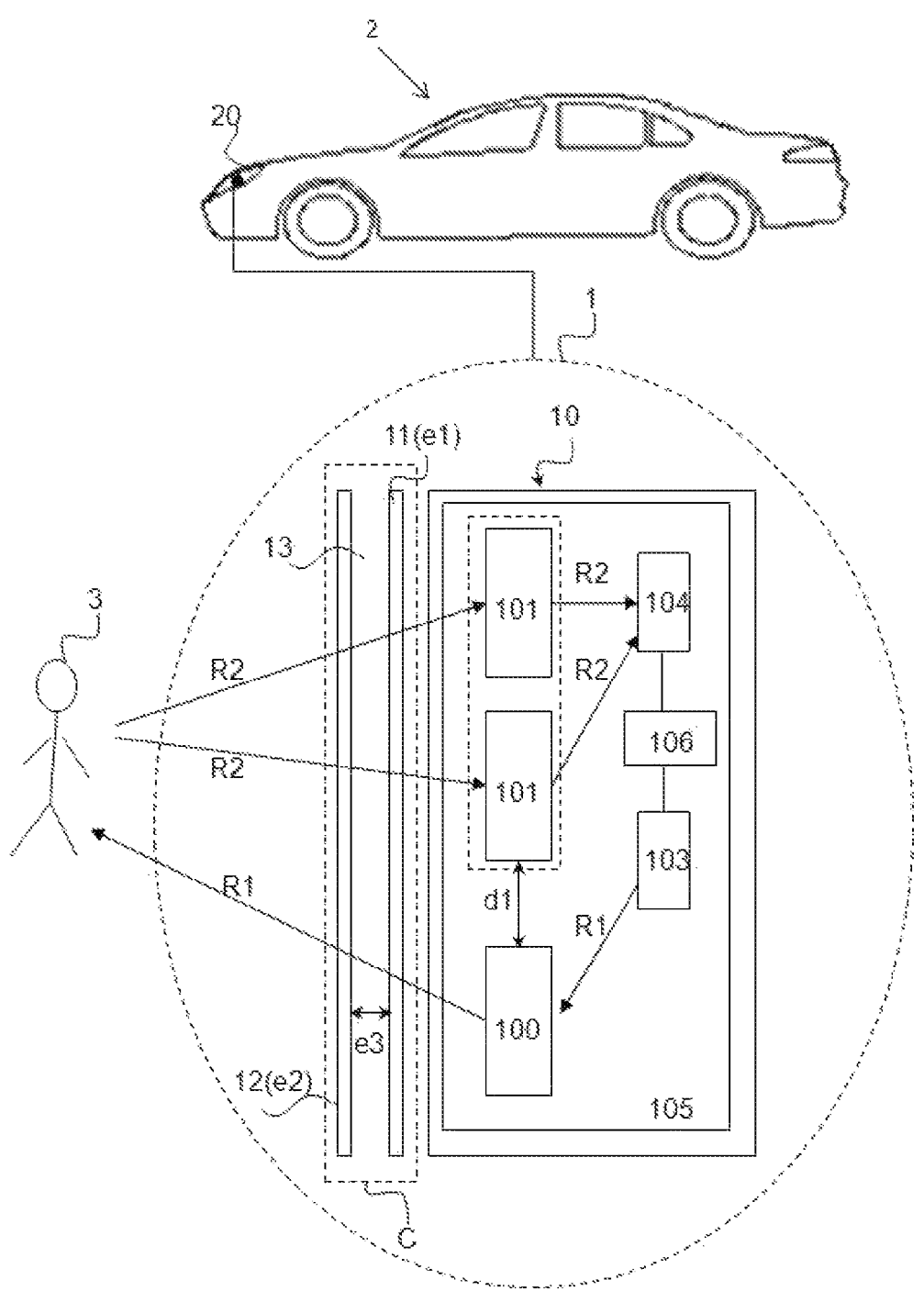
FIG. 1 is a schematic view of a vehicle assembly, said vehicle assembly comprising a radar sensor and a layer assembly with at least two dielectric layers including a primary layer and a secondary layer separated by a layer of air, according to a first non-limiting embodiment of the invention.
Figure 3:
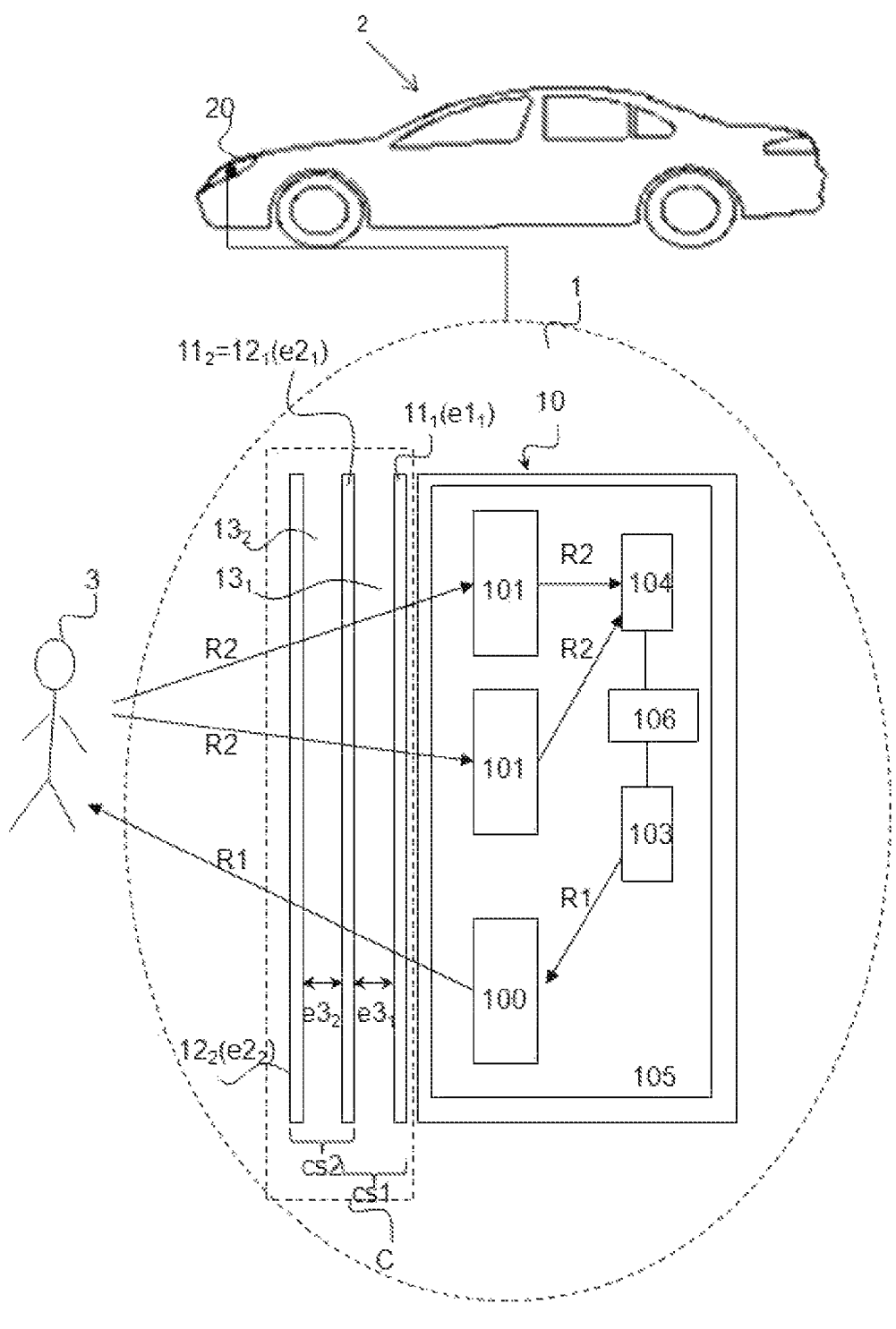
FIG. 3 is a schematic view of a vehicle assembly, said vehicle assembly comprising a radar sensor and a layer assembly with more than two dielectric layers including two primary layers and two secondary layers, each primary layer-secondary layer assembly being separated by one layer of air, according to a second non-limiting embodiment of the invention.

As illustrated in FIGS. 1 and 3, the vehicle assembly 1, which is also referred to as the vehicle arrangement 1, comprises:
- a radar sensor 10 configured to transmit/receive radar waves 111, and
- a layer assembly C, also referred to as the layer arrangement C, which comprises at least two dielectric layers 11, 12, these dielectric layers including a primary layer 11 and a secondary layer 12 separated by a layer of air 13.

These elements are described below. The radar sensor 10 is described below.

The radar sensor 10 is placed facing the primary layer 11. In one non-limiting embodiment, the radar sensor 10 is a radar sensor employing millimeter waves (waves between 24 GHz and 300 GHz) or sub-microwaves (waves between 300 MHz and 81 GHz) or microwaves (waves between 1 GHz and 300 GHz). In one non-limiting variant of embodiment, the radar sensor 10 operates at a radar frequency comprised between 76 GHz and 81 GHz. In one non-limiting embodiment, the radar waves R1 are transmitted in a frequency band comprised between 100 MHz and 3 GHz. Thus, in one non-limiting example, if the sensor operates at a radar frequency of 77 GHz with a frequency band of 1 GHz, the radar sensor 10 will operate in a frequency band from 76.5 GHz to 77.5 GHz.

The radar sensor 10 is configured to scan the environment outside the motor vehicle 2, by virtue of transmission of radar waves R1. As illustrated in FIGS. 1 and 3, the radar sensor 10 thus comprises:
- at least one transmit antenna 100 configured to transmit primary radar waves R1,
- at least two receive antennas 101 configured to receive secondary radar waves R2.

The radar sensor 10 further comprises at least one transmitter 103 configured to generate the primary radar waves R1 and at least one receiver 104 configured to process the secondary radar waves R2 received in return. In one non-limiting embodiment, a single electronic component may be used for both the transmission function and the reception function. There will thus be one or more transceivers. Said transmitter 103 generates primary radar waves R1, which are subsequently transmitted by the transmit antenna 100, and which, when they encounter an object 3 (here a pedestrian in the non-limiting example illustrated) in the environment outside the motor vehicle 2, reflect from said object 3. The radar waves thus reflected are waves that are transmitted back to the radar sensor 10. These are the secondary radar waves R2 received by the receive antennas 101. These are radar waves retransmitted in the direction of the radar sensor 10. In one non-limiting embodiment, the primary radar waves R1 and the secondary radar waves R2 are radio-frequency waves. In one non-limiting embodiment, the radar sensor 10 comprises a plurality of transmitters 103 and a plurality of receivers 104.

The transmit antenna 100, also referred to as the antenna 100, is configured to transmit the primary radar waves R1 generated by the transmitter 103. The receive antennas 101, also referred to as the antennas 101, are configured to receive the secondary radar waves R2 and communicate them to the receiver 104, which subsequently processes them. There is a phase shift between the secondary radar waves R2 received by the receive antennas 101, which allows the position of the object 3 with respect to the motor vehicle 2 to be deduced, said object 3 being located in the environment outside of the motor vehicle 2. In non-limiting embodiments, the antennas 100, 101 are patch antennas or slot antennas.

In one non-limiting embodiment, the antennas 100, 101, the transmitter 103 and the receiver 104 are placed on a printed circuit board 105. In one non-limiting embodiment, the printed circuit board is a rigid printed circuit board, a.k.a. a printed circuit board assembly or PCBA, or a flexible printed circuit board, a.k.a. a flex board.

The radar sensor 10 further comprises an electronic control unit 106 configured to control the transmitter 103 and the receiver 104. Since such a radar sensor is known to those skilled in the art, it is not described in more detail here.

The layer assembly C is described below.

In one non-limiting embodiment, the primary layer 11 is a decorative part (a.k.a. bezel) and the secondary layer 12 is an exit lens of a light-emitting device 20 of said motor vehicle. In one non-limiting embodiment, the light-emitting device 20 is a headlamp or a tail lamp of the vehicle 2. In another non-limiting embodiment, the primary layer 11 is a luminous element of an illuminated logo and the secondary layer 12 is an exit lens of the illuminated logo. In one non-limiting example, said luminous element is a light guide. In another non-limiting embodiment, the primary layer 11 is a radome and the secondary layer 12 is a logo, optionally an illuminated logo. In another non-limiting embodiment, the primary layer 11 is a radome and the secondary layer 12 is an exit lens of a light-emitting device 20. In one non-limiting embodiment, the light-emitting device 20 is a headlamp or a tail lamp of the vehicle 2.

The primary layer 11 and the secondary layer 12 are made of a dielectric. In non-limiting embodiments, the dielectric is plastic, glass or ceramic. In one non-limiting example, the plastic is polycarbonate. It will be recalled that a dielectric is non-conductive and therefore lets the radar waves R1 pass, unlike a conductor.

In a first non-limiting embodiment illustrated in FIG. 1, the layer assembly C comprises a single primary layer 11 and a single secondary layer 12 separated by a layer of air 13.

Figure 2:
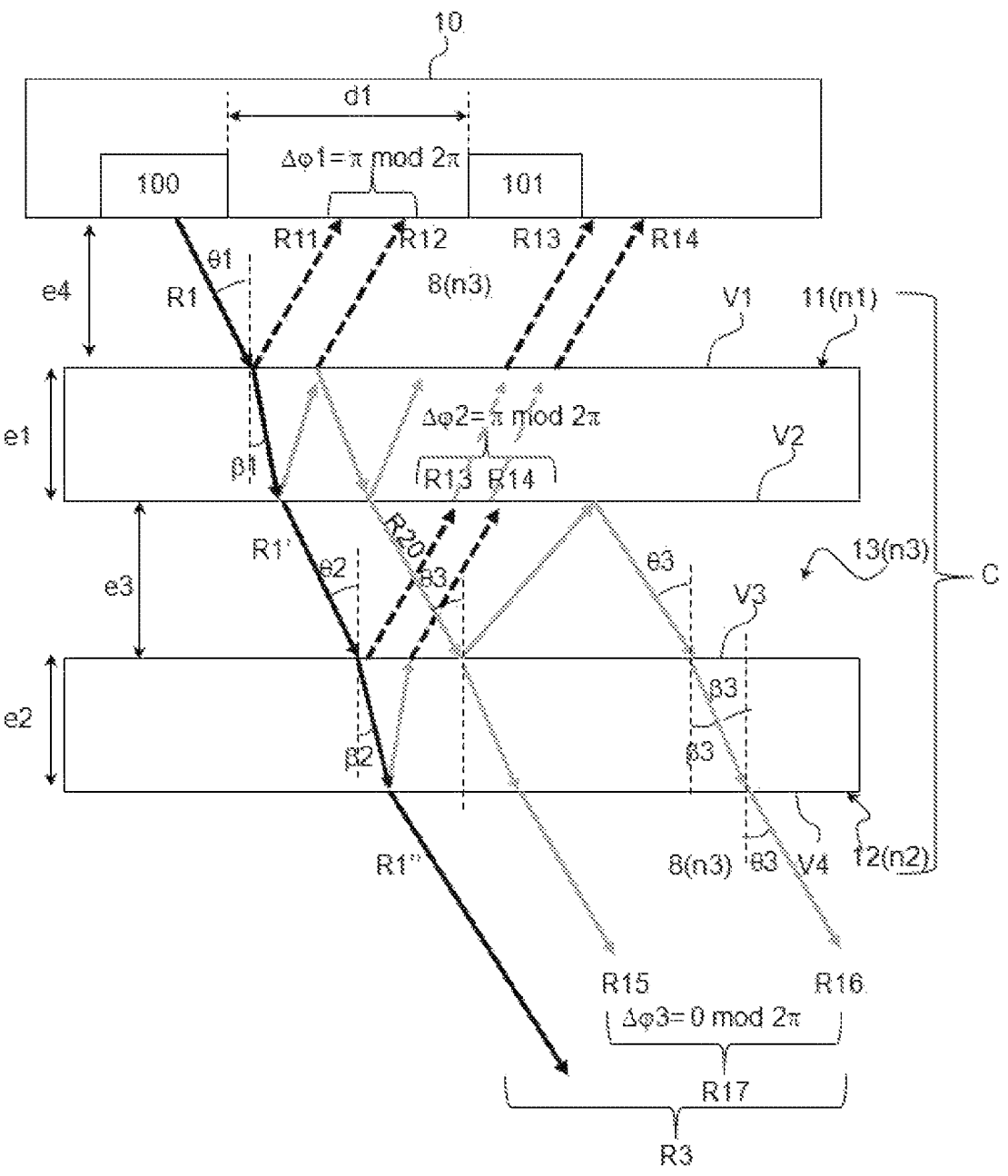
FIG. 2 is a schematic view of propagation of a radar wave transmitted by the radar sensor of said vehicle assembly of FIG. 1, and of its reflections from the two dielectric layers, according to one non-limiting embodiment.

As illustrated in FIG. 2, the primary layer 11 has a thickness e1, also referred to as the primary thickness e1, and two surfaces V1 and V2 that are surfaces of transition from one medium to another, which surfaces are also referred to as the dioptric interfaces V1 and V2. As illustrated in FIG. 2, at the dioptric interface V1 the waves pass from the air (which has been designated by the reference 8) to the dielectric of the primary layer 11. At the dioptric interface V2, the waves pass from the dielectric of the primary layer 11 to the air 8. The primary layer 11 has a refractive index n1.

The secondary layer 12 has a thickness e2, also referred to as the secondary thickness e2, and two surfaces V3 and V4 that are surfaces of transition from one medium to another, which surfaces are also referred to as the dioptric interfaces V3 and V4. As illustrated in FIG. 2, at the dioptric interface V3 the waves pass from the layer of air 13 to the dielectric of the secondary layer 12. At the dioptric interface V4, the waves pass from the dielectric of the secondary layer 12 to the air (which has been designated by the reference 8 in the figure). The secondary layer 12 has a refractive index n2.

The layer of air 13 has a thickness e3, which is also referred to as the tertiary thickness e3. The layer of air 13 has a refractive index n3 equal to 1.

Such as illustrated in FIG. 2, when a radar wave R1 is transmitted, part of it passes through the primary layer 11, the layer of air 13 and the secondary layer 12.

When the transmitted radar wave R1 passes through the primary layer 11, a part R1' passes through the layer of air 13. This radar wave is referenced R1' in FIG. 2 and is called the exiting radar wave R1'; another part will be reflected in the primary layer 11. Part of the exiting radar wave R1' will enter into the secondary layer 12 directly after having passed through the layer of air 13 and exit from the secondary layer 12 directly. This exiting radar wave is referenced R1'' and is called the exiting radar wave R1''. It will be noted that once the exiting radar wave R1' has entered and exited the secondary layer 12, it becomes an exiting radar wave R1'', the latter having a power that is lower than that of the exiting radar wave R1' and therefore than that of the radar wave R1 initially transmitted by the radar sensor 10. This thus decreases the detection range of the radar sensor, since the power is lower.

When the radar wave R1 is transmitted, another part reflects from the surfaces V1 and V2, this creating reflected waves R11 and R12 said to be of order 1, respectively. Thus, the transmitted radar wave R1 is reflected on the one hand directly from the surface V1 out of the primary layer 11, resulting in the reflected wave R11, and on the other hand from the surface V2 into the primary layer 11, resulting in the reflected wave R12. The reflected waves R11 and R12, which are also referred to as the waves R11 and the waves R12, are parasitic reflections that return to the radar sensor 10 and that decrease the signal-to-noise ratio of the radar sensor 10, since they are reflected back in the direction of the radar sensor 10. Thus, this also leads to a decrease in the detection range of the radar sensor since said reflected waves R11 and R12 will cause disruption at the receive antennas 101. Consequently, detection errors or non-detection of an object even though the latter is present in the environment outside the vehicle may occur. As described below, they are eliminated to prevent the signal-to-noise ratio of the radar sensor 10 from being decreased.

As illustrated in FIG. 2, the transmitted radar wave R1 strikes the primary layer 11 with an angle of incidence $\theta1$. When the angle of incidence $\theta1$ is different from 0°, the corresponding refracted angle, referenced $\beta1$ in FIG. 2, is also different from 0°. The path $\delta1$ traveled by the reflected waves in the primary layer 11 is equal to $2e1/\cos(\beta1)$. The phase shift $\Delta\phi1$ between the reflected waves R11 and R12 thus depends on the cosine of the refracted angle $\beta1$ (and therefore on the cosine of the angle of incidence $\theta1$) and on the thickness e1 of the primary layer 11. It may be shown that $\Delta\phi1=(2\pi(n1\delta1-2e1 \tan(\beta1)\sin(\theta1))/\lambda)+\pi$ with $\lambda$ the wavelength of the transmitted radar wave R1, and with $n3 < n1$.

In one non-limiting embodiment, the primary layer 11 has a thickness e1 such that the reflected waves R11, R12 of order 1 corresponding to said transmitted radar wave R1 are in phase opposition. Their phase shift $\Delta\phi1$ is therefore $\pi$ modulo $2\pi$. This creates destructive interference. To the 1st order, the reflected waves R11 and R12 are therefore eliminated by making it so that they cancel each other out partially. To the 1st order, the reflected waves R11 and R12 are therefore eliminated by making it so that they cancel each other out partially. They thus decrease the signal-to-noise ratio less. It should be noted that the waves R11 and R12 do not strictly cancel each other out, due to the necessarily lower amplitude of the wave R12 with respect to the wave R11. There is always a very weak residual of order 3. It will be recalled that the reflected waves of order 2 have a lower power than the reflected waves of order 1, and that the waves of order 3 have a lower power than the reflected waves of order 2.

It may therefore be shown that, since $\sin(\theta1)=n1\sin(\beta1)$, $\Delta\phi1=(2\pi\times n1\times(2e1\times\cos \beta1)/\lambda)+\pi$. However, as it is necessary for $\Delta\phi1=\pi$ modulo $2\pi$, it is therefore necessary for $e1=(\lambda/(2n1 \cos \beta1))+(m1\times\lambda)$ whatever the value of the angle of incidence $\theta1$, with $m1=1, \ldots N$, N being an integer. It will be noted that the values of the angle of incidence $\theta1$ are comprised within the possible angles of transmission of the radar sensor 10. The possible values of the angle of incidence $\theta1$ are defined in the technical specifications of the radar sensor 10. Conventionally the angle of incidence $\theta1$ is comprised between 0° and 30°. It will be noted that there is a value of the angle of incidence $\theta1$ for which the parasitic reflections R11 and R12 cause maximum disruption at the receive antennas 101 of the radar sensor 10. In one non-limiting embodiment, this value is equal to $\theta1=\arctan(d1/(2e4))$, with dl the distance between the transmit antenna 100 and the receive antennas 101, and e4 the distance between the radar sensor 10 and the primary layer 11, as illustrated in FIG. 2. Thus, depending on the value of the refractive index n1 and on the wavelength $\lambda$ used in the range of operating frequencies of the radar sensor 10 (between 76 GHz and 81 GHz in the non-limiting example given), it is possible to determine the value that the thickness e1 must have for the reflected waves R11 and R12 of order 1 to cancel each other out partially. In one non-limiting embodiment, the thickness e1 is comprised between 2 and 3 millimeters (mm). In one non-limiting example, if n1=1.66 for polycarbonate and the wavelength λ corresponds to a frequency of 76 GHz, e1=2.36 mm, for θ1=0°, and with m1=2. In one non-limiting embodiment, the value of the thickness e1 is defined for an angle of incidence θ1=arctan (d1/(2e4)). This makes it possible to be sure that the disruption created by the reflected waves R11 and R12 is eliminated where it is maximum.

As described above, when the radar wave R1 exits from the primary layer 11, it becomes an exiting radar wave R1' that has a lower power than the transmitted radar wave R1. When the exiting radar wave R1' passes through the secondary layer 12, it reflects from the surfaces V3 and V4, this creating reflected waves R13 and R14 said to be of order 1, respectively. Thus, the exiting radar wave R1' is reflected on the one hand directly from the surface V3 out of the secondary layer 12, resulting in the reflected wave R13, and on the other hand from the surface V4 into the secondary layer 12, resulting in the reflected wave R14. The reflected waves R13 and R14, which are also referred to as the waves R13 and the waves R14, are parasitic reflections that return to the radar sensor 10 and that decrease the signal-to-noise ratio of the radar sensor 10, since they are reflected back in the direction of the radar sensor 10. This thus also decreases the detection range of the radar sensor. Consequently, detection errors or non-detection of an object even though the latter is present in the environment outside the vehicle may occur. As described below, they are eliminated to prevent the signal-to-noise ratio of the radar sensor 10 from being decreased.

The exiting radar wave R1' strikes the secondary layer 12 with an angle of incidence θ2.

When the angle of incidence θ2 is different from 0°, the corresponding refracted angle, referenced β2 in the figure, is also different from 0°. The path δ2 traveled by the reflected waves R14 is equal to 2e2/ cos(β2). The phase shift Δφ2 between the reflected waves R13 and R14 thus depends on the cosine of the refracted angle βb (and therefore on the cosine of the angle of incidence θ2) and on the thickness e2 of the secondary layer 12. It may be shown that Δφ2=(2n (n2δ2−2e2 tan(β2)sin(θ2))/λ)+π. Therefore, Δφ2=(2π× (2n2e2 cos(β2))/λ)+π with n3<n2. It will be noted that θ2=θ1 because the exiting radar wave R1' exits the primary layer 11 with the same angle of incidence as the radar wave R1 entering into the primary layer 11. Thus, the exiting radar wave R1' enters the secondary layer 12 with the same angle of incidence.

In one non-limiting embodiment, the secondary layer 12 has a thickness e2 such that the reflected waves R13, R14 of order 1 corresponding to said transmitted radar wave R1 are in phase opposition. Their phase shift Δφ2 is therefore π modulo 2π. This creates destructive interference. In the same way as the reflected waves R11 and R12, the reflected waves R13 and R14 cancel each other out partially. The reflected waves R13 and R14 are therefore eliminated by making it so that that they cancel each other out partially. They thus decrease the signal-to-noise ratio less. It should be noted that the waves R13 and R14 do not strictly cancel each other out, due to the necessarily lower amplitude of the wave R14 with respect to the wave R13. There is always a very weak residual of order 3.

In other words, Δφ2=π modulo 2π=π+m2×2π, with m2=1, . . . N, N being an integer. That is with e2=(λ/(2n2 cos β2))+(m2×λ), whatever the value of the angle of incidence θ2. Thus, depending on the value of the refractive index n2 and on the wavelength λ used in the range of operating frequencies of the radar sensor 10, it is possible to determine the value that the thickness e2 must have for the reflected waves R13 and R14 of order 1 to cancel each other out. In one non-limiting embodiment, the thickness e2 is comprised between 2 and 3 millimeters (mm). In one non-limiting example, if n2=1.66 for polycarbonate and the wavelength λ corresponds to a frequency of 76 GHz, e2=2.36 mm, for θ2=0°, and with m2=2.

As illustrated in FIG. 2, as the transmitted radar wave R1 is passing through the primary layer 11, it may be reflected a number of times inside said primary layer 11 from the surfaces V1, V2. It may reflect a number of times from the surfaces V1, V2, this creating other reflected waves (illustrated in gray in the figure). Some of these reflected waves exit in the direction of the secondary layer 12 so as to pass through the layer of air 13. These are reflected waves exiting from the primary layer 11, and have been designated by the reference R20 in FIG. 2. The exiting reflected waves 20 are thus derived, in other words stem, from the radar waves R1 transmitted by said radar sensor 10. They strike the secondary layer 12 with an angle of incidence θ3.

Some of the reflected waves R20 exiting from the primary layer 11 pass through the layer of air 13 and pass through the secondary layer 12 directly. They strike the secondary layer 12 with the angle of incidence θ3. On passage through the secondary layer 12, some of these reflected waves exit from the secondary layer 12 directly. These are the reflected waves designated by the reference R15. They are of order 2 because they result from other reflected waves. The reflected waves R15 of order 2 thus result from waves that have been reflected by a surface V1 inside the primary layer 11 and that have passed through the layer of air 13 and the secondary layer 13 directly.

The rest R20 of the reflected waves exiting the primary layer 11 pass through the layer of air 13 and alternately reflect from the surface V2 out of the primary layer 11 and from the surface V3 out of the secondary layer 12 before subsequently passing through the secondary layer 12 and exiting from the secondary layer 12. They also strike the secondary layer 12 with the angle of incidence θ3. These are the reflected waves designated by the reference R16. They are of order 2 because they result from other reflected waves. The reflected waves R16 of order 2 thus result from waves that have been reflected into the layer of air 13 by an exterior surface V2 of the primary layer 11 and that have mainly passed through the secondary layer 12.

These reflected waves R15, R16 of order 2, which exit from the secondary layer 12 in a direction that leads them to move away from the radar sensor 10, are residual reflected waves that affect the range at which the radar sensor 10 detects an object 3 in the environment outside the motor vehicle 2 because they have a lower power than the transmitted radar wave R1. It will be recalled that the waves of order 2 have a lower power than reflected waves of order 1.

The difference δ3 in the paths traveled by the reflected waves R16 and the reflected waves R15 is equal to 2e3/ cos(θ3)−2e3 tan(θ3)sin(θ3). The phase shift Δφ3 between the reflected waves R16 and R16 thus depends on the cosine of the angle of incidence θ3 and on the thickness e3 of the layer of air 13. It may be shown that Δφ3=2πn3δ3/λ32 2πδ3/λ with n3=1 (air). Therefore, Δφ3=4π×(e3×cos(θ3))/λ.

In order to make these residual reflected waves R15, R16 add together so that more power may be obtained, the layer of air 13 has a thickness e3 such that two reflected waves R15, R16 of order 2 exiting from said secondary layer 12, and corresponding to a transmitted radar wave R1, have a phase shift Δφ3=0 modulo 2π. The reflected waves R15 and R16 are thus in phase. The phase shift of 0 modulo 2π makes it possible to add the reflected waves R15 and R16 together so that their powers add together and thus a resulting reflected wave R17 of higher power is obtained. In other words, it is necessary for $\Delta\varphi3=4\pi\times(e3\ \cos(\theta3))/\lambda=2\pi m3$, with m3=1, . . . N, N being an integer. That is with e3=(m3×(λ/2))/cos(θ3), with λ the wavelength of the transmitted radar wave R1 and θ3 the angle of incidence of the reflected waves R20 entering into the secondary layer 12, whatever the value of the angle of incidence θ3. Thus, depending on the wavelength λ used, corresponding to the range of operating frequencies of the radar sensor 10, it is possible to determine the value that the thickness e3 must have for the reflected waves R15 and R16 of order 2 to add together. In one non-limiting example, if the wavelength λ corresponds to a frequency of 76 GHz, and θ3=0°, e3=1.98 mm with m=1, and e3>1.98 mm for θ3>0° with m3=1.

As mentioned above, in one non-limiting embodiment, the primary layer 11 and the secondary layer 12 will preferably be optimized for an angle equal to θ1=arctan(d1/(2e4)), with d1 the distance between the transmit antenna 100 and the receive antennas 101, and e4 the distance between the radar sensor 10 and the primary layer 11, as illustrated in FIG. 2. The thickness e3, in one non-limiting embodiment, will preferentially be optimized for an angle different from θ1. On production, the thickness e3 and the operating frequency of the radar may vary from their respective nominal values. In order to take these variations into account, a coefficient ε∈[−0.25; +0.25] is inserted into the equation for e3: e3=((m3+ε)×(λ/2))/cos(θ3). e3 will therefore be comprised in this range of values.

The reflected wave R17 resulting from the addition of the reflected waves R15 and R16 will thus allow precise detection by the radar sensor 10. Specifically, its power will be added to that of the radar wave R1″ exiting directly from the secondary layer 12, the choice of e1 ensuring that R15 and R1″ are in phase. The reflected wave R17 and the radar wave R1″ form an overall exiting radar wave, designated by the reference R3 in FIG. 2, and also referred to as the overall wave R3. Thus, the obtained overall power of the overall radar wave R3 exiting from the secondary layer 12 (which will therefore be used to detect the object 3) will be very close to that of the radar wave R1 initially transmitted by the radar sensor 10.

In one non-limiting embodiment θ3=θ1=θ2. This is the case if the primary layer 11 and the secondary layer 12 are placed parallel to each other and have planar surfaces V1, V2, V3, and V4. In this case, e3=(m3/ cos(θ1))×λ/2.

It will be noted that the radar sensor 10 operates in a frequency band (between 100 MHz and 3 GHz in one non-limiting embodiment) and not at a single frequency. As in the layer assembly C there are layers of a plurality of thicknesses e1, e2, e3, it is possible to adjust these thicknesses to create an anti-reflection band-pass filter. Thus, in one non-limiting embodiment, as each thickness e1, e2, e3 depends on the wavelength λ, each thickness e1, e2, e3 may be defined depending on a different wavelength λ1, λ2, λ3, the three wavelengths selected being located in the frequency band (between 100 MHz and 3 GHz here). Thus, in one non-limiting example, if the frequency and is 1 GHz and the radar sensor 10 operates at the frequency 76 GHz, a wavelength λ1 corresponding to the frequency 75 GHz is chosen to define the thickness e1, a wavelength λ2 corresponding to the frequency 77 GHz is chosen to define the thickness e2, and a wavelength λ3 corresponding to the frequency 76 GHz is chosen to define the thickness e3. Thus, in the frequency band 75 GHz, 76 GHz and 77 GHz, detection by the radar sensor 10 is very precise because there are no longer any parasitic reflections R11, R12, R13, R14 and the radar waves R15, R16 add, and thus there is very little loss in the power output by the layer assembly C. There will be parasitic reflections, but these will be very strongly attenuated over the entire frequency range of operation of the radar sensor 10. Thus the (distancewise) detection resolution of the radar sensor 10 will be better. In another non-limiting example, the detection resolution will be 0.4 centimeters (cm) for a frequency of 350 MHz and 0.2 cm for a frequency of 750 MHz. Thus, for example, the radar sensor 10 will be able to detect an object 3 in the environment outside the motor vehicle 2 to be at a given distance to within 0.4 cm or 0.2 cm. In another non-limiting embodiment, each thickness e1, e2, e3 may be defined depending on the same wavelength λ.

It will be noted that the description was given for a single radar wave R1, but of course it is applicable to all the radar waves R1 transmitted by the radar sensor 10.

It will be noted that the description provided above with respect to a layer assembly C comprising a single primary layer 11 and a single secondary layer 12 separated by a layer of air 13 is applicable to a layer assembly C comprising a plurality of sub-assemblies cs of primary layers 11 and secondary layers 12, each primary layer 11 and secondary layer 12 of a sub-assembly cs being separated in the same way by a layer of air 13. Thus, in one non-limiting embodiment, said layer assembly C comprises more than two dielectric layers 11, 12, these dielectric layers including primary layers 11 and secondary layers 12 separated by a layer of air 13. There are thus a plurality of layers of air 13. Thus, the vehicle assembly 1 comprises more than two dielectric layers 11, 12 separated by a layer of air 13.

Thus, in the non-limiting example illustrated in FIG. 3, the layer assembly C comprises:

a first layer sub-assembly cs1 comprising a first primary layer 111 with a thickness e11 and a first secondary layer 121 with a thickness e21, separated by a layer of air 131, a second layer sub-assembly cs2 comprising a second primary layer 112 with a thickness e12 and a second secondary layer 122 with a thickness e22, separated by a layer of air 132.

As illustrated in FIG. 3, the first secondary layer 121 of the first sub-assembly cs1 is also the second primary layer 112 of the second sub-assembly cs2. Thus, in a first non-limiting embodiment, the first layer sub-assembly cs1 comprises a first primary layer 111, which is a radome of the radar sensor 10, and a first secondary layer 121, which is a decorative part, separated by a first layer of air 131; and the second layer sub-assembly cs2 comprises a second primary layer 112, which is said decorative part, and a second secondary layer 122, which is an exit lens of a light-emitting device 20 of the motor vehicle 2, separated by a second layer of air 132. In a second non-limiting embodiment, the first layer sub-assembly cs1 comprises a first primary layer 111, which is a radome of the radar sensor 10, and a first secondary layer 121, which is a luminous element, separated by a first layer of air 131; and the second layer sub-assembly cs2 comprises a second primary layer 112, which is said luminous element, and a second secondary layer 122, which is an exit lens of a light-emitting device 20 of the motor vehicle 2, separated by a second layer of air 132.

In other words, the vehicle assembly 1 may further comprise a radome separated from a decorative part by a layer of air 13, said decorative part 11 itself being separated from an exit lens by a layer of air 13. The decorative part may be replaced by a luminous element. It will be noted that the more layers there are in the layer assembly C the more room there is to enhance the anti-reflection bandpass filter by adjusting the various thicknesses of the various layers, through choice of various wavelengths λ for various thicknesses in one non-limiting embodiment.

Thus, said layer assembly C comprises more than two dielectric layers, these dielectric layers including primary layers 111, 112 and secondary layers 121, 122 separated, pairwise, by a layer of air 131, 132. Namely, a first primary layer 111 is separated from a first secondary layer 121 by a first layer of air 131 and a second primary layer 112 is separated from a second secondary layer 122 by a second layer of air 132. Thus, as described above, there is a layer 111, which is a radome, and which has a thickness e11; a layer 121, which is a decorative part, and which has a thickness e21; and an additional layer 122, which is an exit lens of a light-emitting device, and which has a thickness e22. Layer 111 is separated from layer 121 by a layer of air 131 of thickness e31. Layer 122 is separated from layer 121 by a layer of air 132 of thickness e32. Thus, in a first layer sub-assembly cs1 (comprising the layers 111 and 121), layer 111 is a primary layer such as described above and layer 121 is a secondary layer such as described above. In contrast, in a second layer sub-assembly cs2 (comprising the layers 121 and 122), the same layer 121 is this time a primary layer, also designated by the reference 112, such as described above and layer 122 is a secondary layer such as described above.

Of course the described invention is not limited to the embodiments described above and to the field described above. Thus, in another non-limiting embodiment, the radar sensor 10 comprises more than one transmit antenna 100 and more than two receive antennas 101.

Thus, the described invention especially has the following advantages:

it allows exiting reflected waves R15, R16 of order 2 to superpose, so as to obtain a higher power for detection by the radar sensor 10, it allows the reflected waves R11, R12, R13 and R14 of order 1 reflected in the direction of the radar sensor 10 to be eliminated. The signal-to-noise ratio of said radar sensor 10 is thus no longer decreased it allows an anti-reflection band-pass filter to be obtained. It allows most reflections to be eliminated across the whole frequency range of operation of the radar sensor 10, regardless of the angle of incidence θ1, θ2, θ3, it allows a better detection resolution to be obtained with the radar sensor 10, it is simple to implement.

The invention claimed is:

1. A vehicle assembly for a vehicle, the vehicle assembly comprising:

a radar sensor configured to transmit or receive a number of radar waves, the radar sensor being placed facing a layer assembly, and the layer assembly, which includes at least two dielectric layers, said dielectric layers including primary layers and secondary layers where each primary layer and each secondary layer is separated by a layer of air;

wherein the layer of air has a thickness equal to ((m3+ε)×(λ/2))/cos (θ3), where λ is a wavelength, where ε includes a value between −0.25 and +0.25, where θ3 represents an averaged angle of incidence from a plurality of exiting reflected waves striking the secondary layer; and where m3 is defined by a number selected in a range from 1 to N, N being a positive integer, said exiting reflected waves derived from each associated radar waves transmitted by the radar sensor;

wherein the primary layer has a thickness equal to (λ/(2×n1×cos β1))+(m1×λ), where β1 is a refracted angle corresponding to an angle of incidence θ1 of each transmitted radar wave and where n1 is a refractive index of the primary layer and m1 is an integer selected from 1 to N; and wherein the thickness of the primary layer is defined by the angle of incidence θ1 equal to arctan (d1/(2e4)), where d1 is a distance between a transmitter antenna and a receiver antenna, and where e4 is a distance between the radar sensor and the primary layer.

2. The vehicle assembly of claim 1, wherein the radar sensor is a radar sensor employing millimeter waves (waves between 24 GHz and 300 GHz) or sub-microwaves (waves between 300 MHz and 81 GHz) or microwaves (waves between 1 GHz and 300 GHz).

3. The vehicle assembly of claim 1, wherein radar waves are transmitted in a frequency band comprised between 100 MHz and 3 GHz.

4. The vehicle assembly of claim 1, wherein the secondary layer has a thickness equal to (λ/(2n2 cos β2))+(m2×λ), with β2 represents a refracted angle corresponding to an averaged angle of incidence θ2 from a plurality of a radar waves exiting from the primary layer; and where n2 is a refractive index of the secondary layer and m2 is an integer selected from 1 to N.

5. The vehicle assembly of claim 1, wherein the primary layer is a decorative part and the secondary layer is an exit lens of a light-emitting device of the vehicle.

6. The vehicle assembly of claim 5, wherein the light-emitting device is a headlamp or a tail lamp.

7. The vehicle assembly of claim 1, wherein the primary layer is a luminous element of a logo and the layer is an exit lens of a logo of the vehicle.

8. The vehicle assembly of claim 1, wherein the primary layer is a radome and the secondary layer is a logo.

9. The vehicle assembly of claim 1, wherein the layer assembly includes a layer that is a radome, a layer that is a decorative part and a layer that is an exit lens of a light-emitting device.

10. A layer assembly for a vehicle, the layer assembly configured to be placed facing a radar sensor and configured to transmit or receive radar waves, comprising:

at least two dielectric layers, said dielectric layers including primary layers and secondary layers where each primary layer and each secondary layer is separated by a layer of air;

wherein the layer of air has a thickness equal to (m3×(λ/2))/cos(θ3), where λ is a wavelength, wherein θ3 is an averaged angle of incidence from a number of exiting reflected waves striking the secondary layer, where m3 is defined by a number selected in a range from 1 to N, N being a positive integer, said exiting reflected waves derived from each associated radar waves transmitted by the radar sensor;

wherein the primary layer has a thickness equal to (λ/(2×n1×cosβ1))+(m1×λ), where β1 is a refracted angle corresponding to an angle of incidence θ1 of each transmitted radar wave and where n1 is a refractive index of the primary layer and m1 is an integer selected from 1 to N; and wherein the thickness of the primary layer is defined by the angle of incidence θ1 equal to arctan (d1/(2e4)), where d1 is a distance between a transmitter antenna and a receiver antenna, and where e4 is a distance between the radar sensor and the primary layer.

\* \* \* \* \*